US011320984B2

(12) United States Patent
Ambha Madhusudhana et al.

(10) Patent No.: US 11,320,984 B2
(45) Date of Patent: May 3, 2022

(54) PRESSURE SENSING DEVICE INTERFACE REPRESENTATION (71) Applicant: Motorola Mobility LLC, Chicago, IL (US)

(72) Inventors: Nikhil Ambha Madhusudhana, Chicago, IL (US); Vivek Kumar Tyagi, Chicago, IL (US); Navin Dabhi, Sunnyvale, CA (US); Hong Zhao, Naperville, IL (US); Sujin Jang, Rolling Meadows, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/544,062

(22) Filed: Aug. 19, 2019

(65) Prior Publication Data

US 2021/0109650 A1 Apr. 15, 2021

(51) Int. Cl.
*G06F 3/04883* (2022.01)
*G06F 3/01* (2006.01)
*G06F 3/041* (2006.01)
*G06F 3/0482* (2013.01)

(52) U.S. Cl.
CPC .......... *G06F 3/04883* (2013.01); *G06F 3/017* (2013.01); *G06F 3/0482* (2013.01); *G06F 3/04144* (2019.05)

(58) Field of Classification Search
CPC .. G06F 3/04883; G06F 3/017; G06F 3/04144; G06F 3/0482; G06F 3/048
See application file for complete search history.

(56) References Cited

U.S. PATENT DOCUMENTS

| | | | |
|---|---|---|---|
| 2010/0085317 A1* | 4/2010 | Park | G06F 3/04817 345/173 |
| 2011/0169868 A1* | 7/2011 | Amemiya | G06F 3/04817 345/676 |
| 2011/0214077 A1* | 9/2011 | Singh | G06F 9/451 715/762 |
| 2012/0317498 A1* | 12/2012 | Logan | G06F 3/04817 715/752 |
| 2013/0093680 A1* | 4/2013 | Ogita | G06F 1/1626 345/168 |
| 2014/0068492 A1* | 3/2014 | Yu | G06F 3/04886 715/773 |
| 2014/0223358 A1* | 8/2014 | Park | G06F 3/0485 715/786 |

(Continued)

OTHER PUBLICATIONS

Blasko, et al., "Single-Handed Interaction Techniques for Multiple Pressure-Sensitive Strips", Published Apr. 24, 2004 in the Extended Abstracts of the Conference on Human Factors in Computing Systems (CHI 2004); pp. 1461-1464.

(Continued)

*Primary Examiner* — Jeanette J Parker (57) ABSTRACT

A system and method of facilitating user interaction with a mobile electronic communication device is provided, for devices having a touch sensitive screen and a housing surface. The described techniques entail displaying visual matter on the touch sensitive screen, detecting a touch on the housing surface, the detected touch having a touch location and touch pressure, and modifying the appearance of the visual matter on the touch sensitive screen based on the touch location and touch pressure.

13 Claims, 11 Drawing Sheets

(56) References Cited

U.S. PATENT DOCUMENTS

| | | | | |
|---|---|---|---|---|
| 2014/0282051 | A1* | 9/2014 | Cruz-Hernandez | ............................ G06F 3/0488 715/744 |
| 2014/0351724 | A1* | 11/2014 | Kim | .................. G06F 3/04883 715/765 |
| 2015/0370403 | A1* | 12/2015 | Nakamura | ............ G06F 1/1626 345/173 |
| 2019/0287492 | A1* | 9/2019 | Kanamaru | ............... G09G 5/38 |
| 2019/0361557 | A1* | 11/2019 | Hung | .................... G06F 3/0414 |
| 2019/0391539 | A1* | 12/2019 | Perkins | .................. G04C 3/008 |
| 2021/0185162 | A1* | 6/2021 | Takahashi | ............... G06F 1/169 |

OTHER PUBLICATIONS

Essk, Georg, "Squeezing the Sandwich: A Mobile Pressure-Sensitive Two-Sided Multi-Touch Prototype", Published at UIST Oct. 4, 2009 Viewed online May 31, 2021 at https://citeseerx.ist.psu.edu/viewdoc/download?doi=10.1.1.156.7591&rep=rep1&type=pdf.

* cited by examiner

PRESSURE SENSING DEVICE INTERFACE REPRESENTATION

TECHNICAL FIELD

The present disclosure is related generally to mobile electronic communications devices and, more particularly, to systems and methods for modifying a visual user interface associated with a mobile electronic communications device.

BACKGROUND

Given the current popularity of smartphones, the inclusion of large displays in mobile electronic communications devices has become common. Indeed, most mobile electronic communications devices now include virtual (displayed) input keys rather than actual hardware keys, and the advent of smart phones reversed the downward trend in phone size that was prevalent until the early 2000's.

However, the increase in available screen area and consequential available phone functionality has of course had no effect on the size of the average human hand. As such, increased screen size has brought with it certain usability problems for users of even average hand size. Typically, a user is easily able to actuate screen-based controls that fall near the tips of their active digit (that is, the finger(s) or thumb used to activate screen-based controls). This puts other controls out of reach unless the user shifts their hand position or overextends their active digit.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, the increased screen size on many mobile electronic devices can create usability problems for device users since many screen controls will be out of reach of the user's active digit unless the user shifts their hand position or otherwise overextends the active digit. In either case, the end result is user inconvenience and lack of full accessibility.

In an embodiment of the disclosed principles, a mobile communications device employs inductive sensors in combination with onscreen elements to bring allow changing interaction capabilities depending upon the user's physical interaction with the non-screen portions of the device. In this embodiment, a gravity parameter is applied to onscreen elements. This may be implemented either by context or by programmatically changing the properties of the element. For example, affected elements can be drawn toward a location of a pressure point.

The inductive capabilities of eth device can be supplemented by IMU (inertial measurement unit) sensors to provide a robust method of determining and tracking the strength and location of pressure points. In a further embodiment, the system additionally enables the user to interact with elements without having to touch the display by varying pressure and location.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
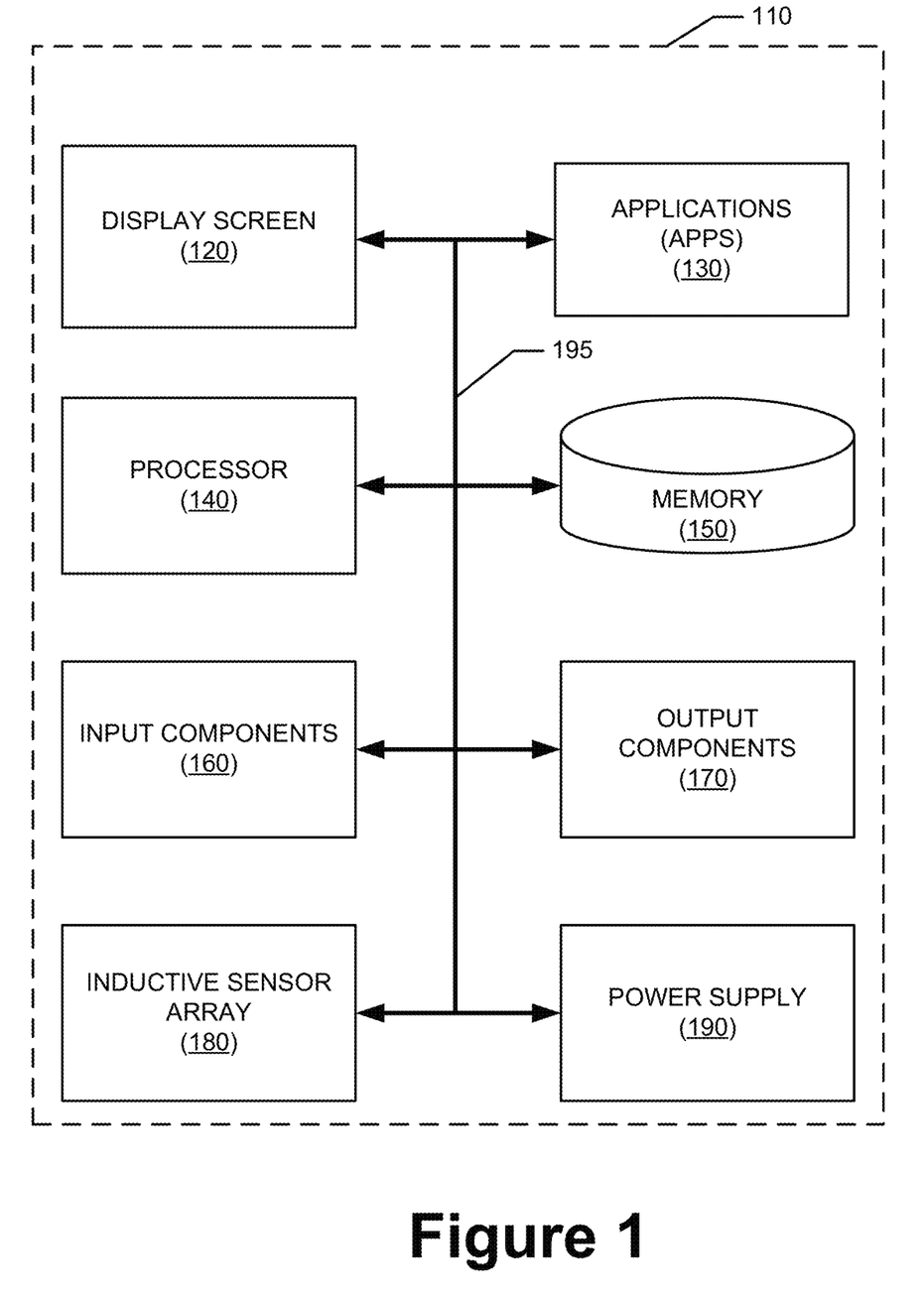
FIG. 1 is a general schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service, e.g., 4G, 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, an inductive sensor array 180 includes inductive sensors at a plurality of locations on the device 110. The sensors of the array 180 may, for example, lie around the perimeter of the device and on the back surface of the device. Other arrangements are also possible.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, the input 160 and output 170 components include one or more accelerometers or other inertial sensors and may also include other location or movement sensors.

Figure 2:
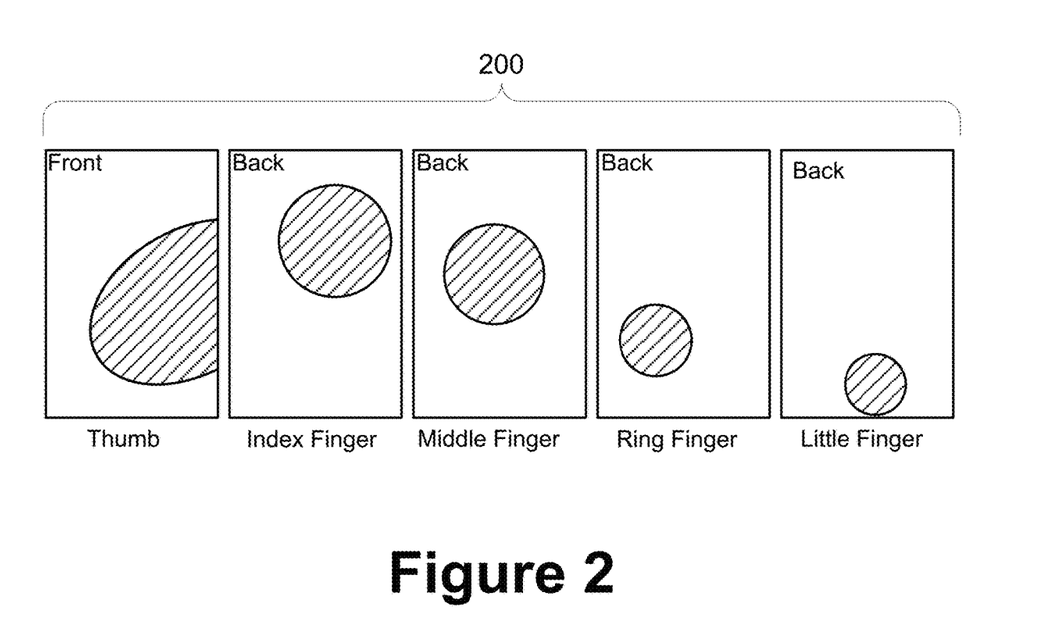
FIG. 2 is a series of device plots showing an approximate reach for each user digit relative to a mobile electronic communication device such as that described in FIG. 1 or otherwise.

As noted above, convenient user accessibility to a typical smartphone screen is often limited by the range of the finger or thumb used to interact with the screen. In this connection, FIG. 2 shows a series of plots illustrating an approximate reach or position for each user digit relative to a mobile electronic communication device such as that described in FIG. 1 or otherwise.

As can be seen, when the user holds the device in their right hand, the user's thumb is adjacent the front surface of the device and the remaining fingers are adjacent the back surface of the device. The series of screen schematics 200 in FIG. 2 show both the pressure spots created by the user's non-active digits on the device (that is, the placement of the index finger, middle finger, ring finger and little finger on the back of the device) as well as the limited reach of the active digit (the user's thumb in this example) on the device front surface comprising the device screen.

Thus for example, if the device detects a pressure pattern on the back of the device, via its inductive sensors, that is similar to that shown in FIG. 2, the device may infer that the device is being held in the user's right hand, and may modify the user interface accordingly, as will be explained in greater detail below.

As noted above, the new interaction mechanism (e.g., drawing or pulling interaction elements toward the user's active digit) is triggered via pressure and position sensors. The decision as to whether to modify the user interface in this way is thus a context-based determination.

Figure 3:
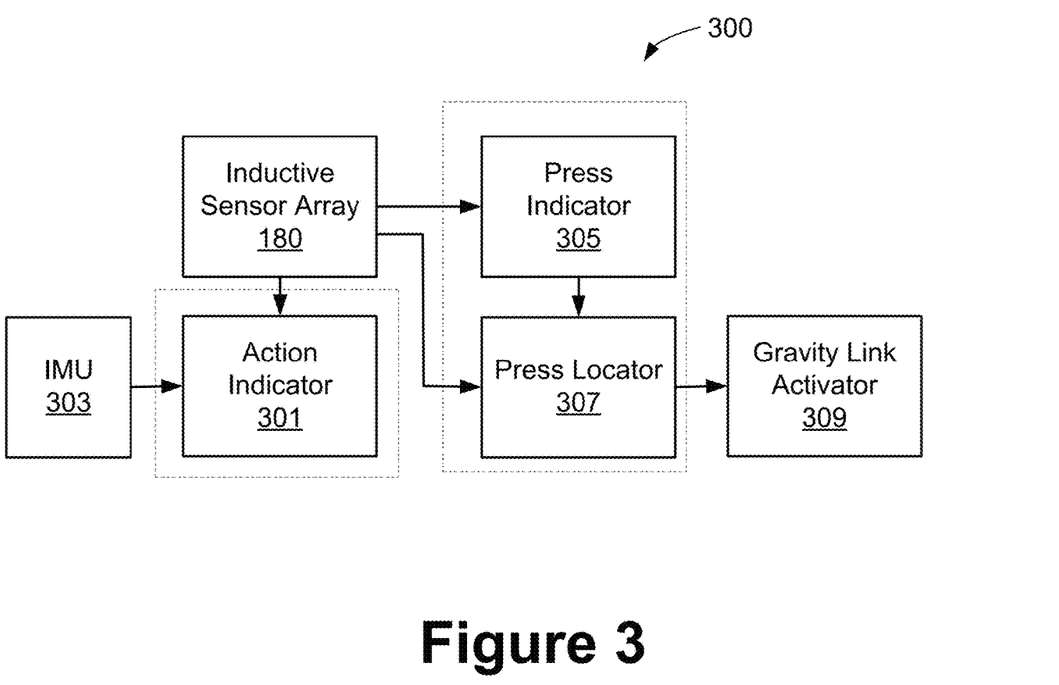
FIG. 3 is a system diagram showing a system for implementing various of the embodiments described herein.
Figure 8:
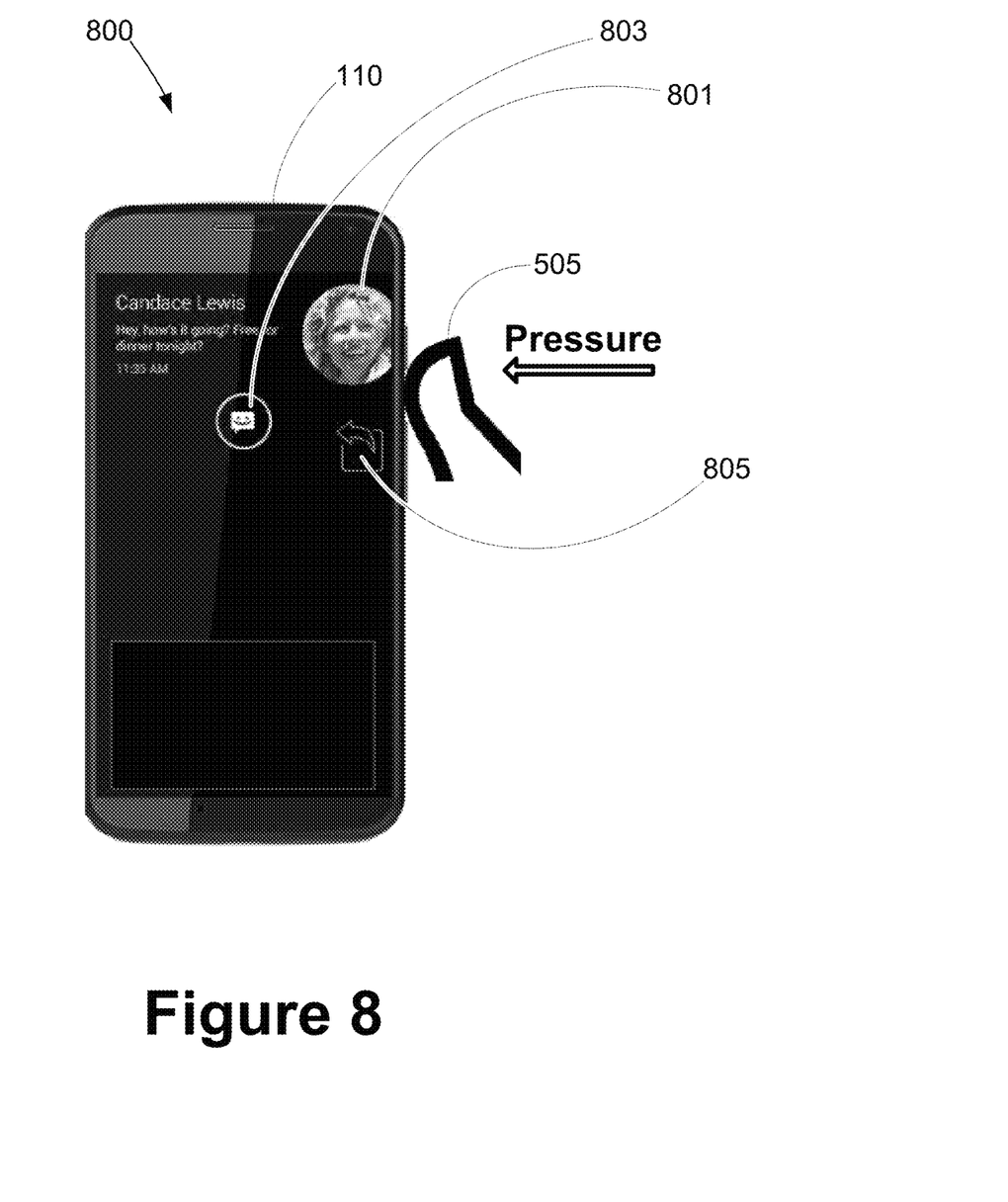
FIG. 8 is a simplified screen schematic showing migration of selectable options in accordance with an embodiment of the described principles.

The example system architecture 300 shown in FIG. 3 is provided for reference while considering the flowing examples and will then be explained in greater detail in conjunction with the flowchart of FIG. 8.

Figure 4:
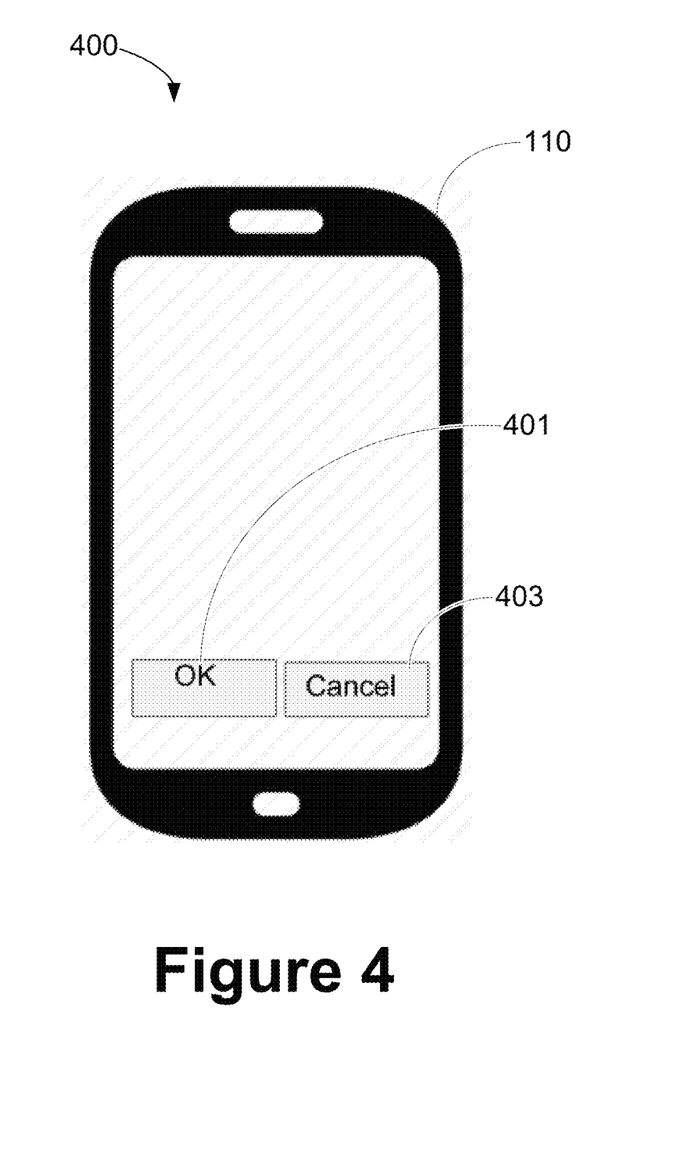
FIG. 4 is a simplified screen schematic showing screen displayed options for user selection in accordance with an embodiment of the described principles.
Figure 5:
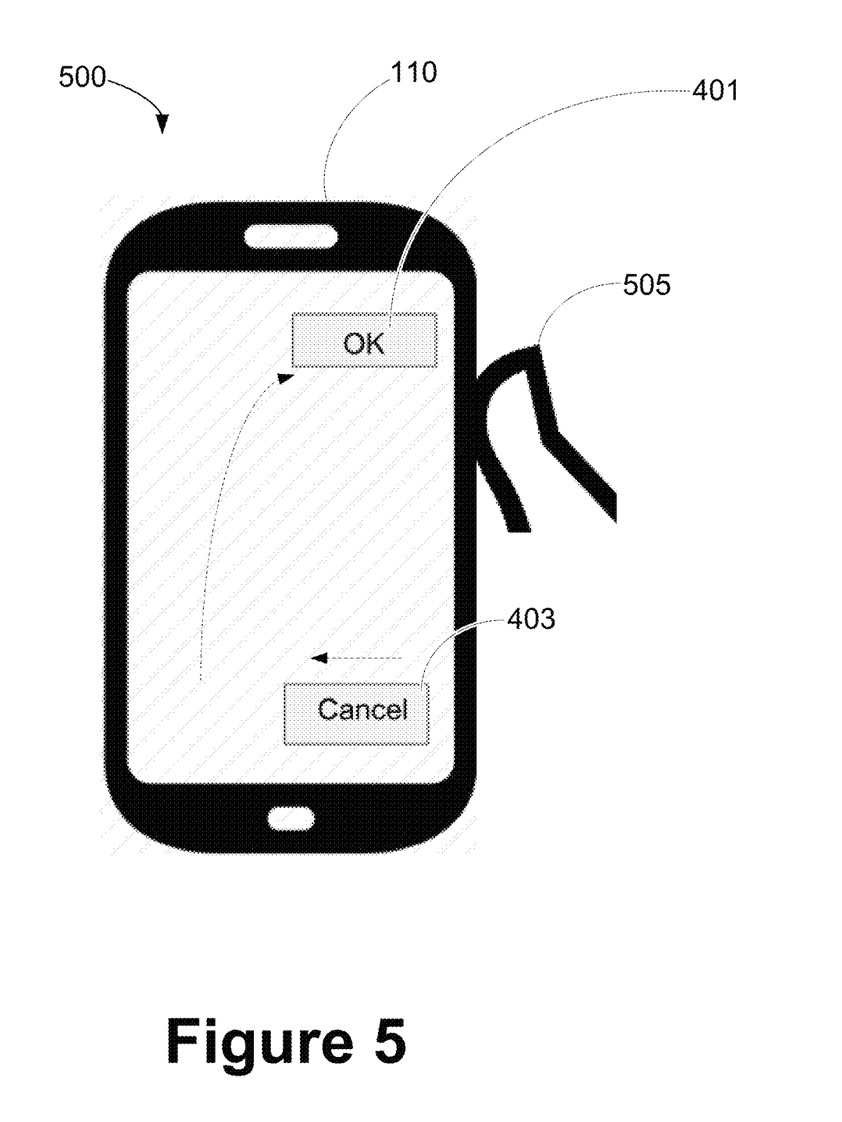
FIG. 5 is a simplified screen schematic showing migration of selectable options in accordance with an embodiment of the described principles.

An example use case is in the context of touchless (no screen touch) user interface modification. This context is exemplified in the schematic user interface 400 of FIG. 4, wherein the device 110 displays a notification for the user to approve ("ok" 401) or cancel (403) the event. When the user subsequently presses the side of the device 110 with, for example, their thumb 505, as shown in context 500 of FIG. 5, the device 110 causes the selectable options 401, 403 to gravitate rightward toward the user's active digit 505. Thus, the "ok" element 401 moves to the high right side of the screen and the "cancel" element 403 moves slightly leftward to be more accessible when the thumb 505 is the active digit.

Figure 6:
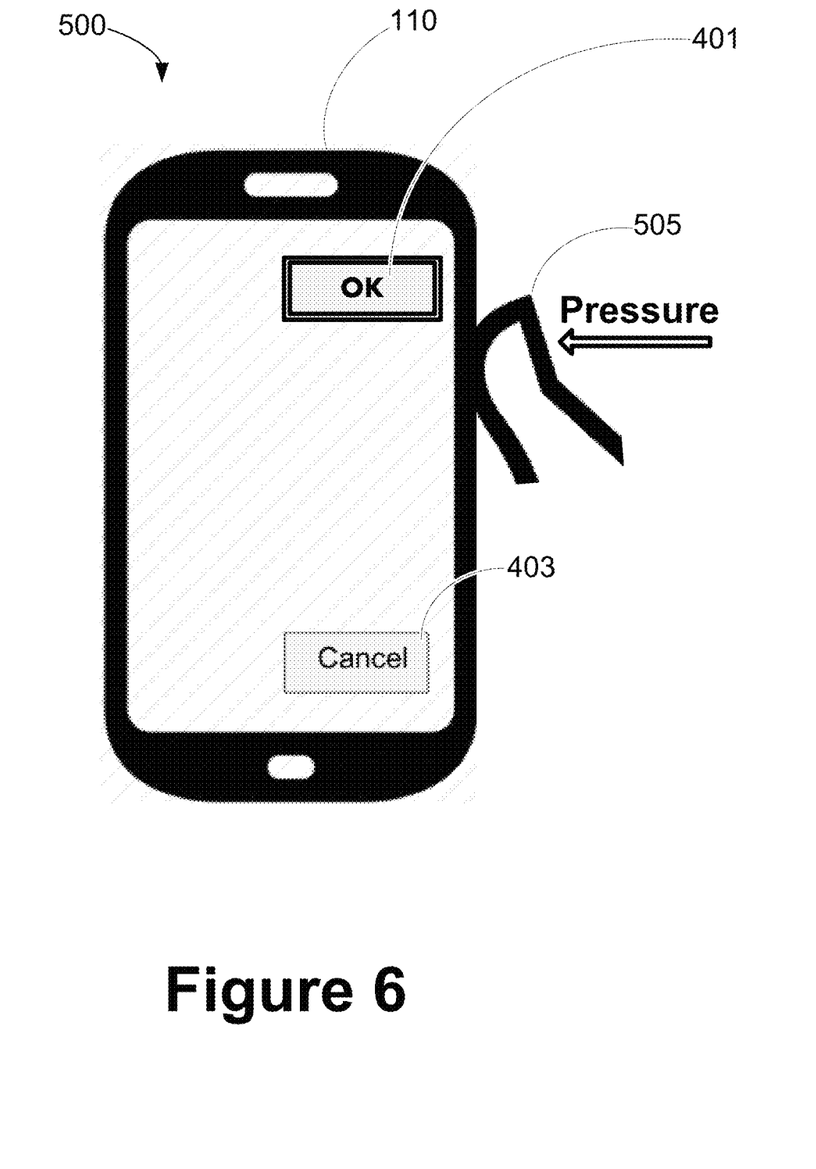
FIG. 6 is a simplified screen schematic showing selection of a selectable option in accordance with an embodiment of the described principles.

As noted above, the user may also select an icon via a variation in one or both of touch location and the touch pressure. By way of example, FIG. 6 shows user activation of the "OK" option icon via a change (increase) in touch pressure at the same touch point as in FIG. 5. It will be appreciated that other location/pressure variations may be used instead. For example, in addition to or instead of increased pressure on a contact sensor, the user may need to hold the pressure and wait for a time out, double tap at the location, or provide another suitable variation.

Figure 7:
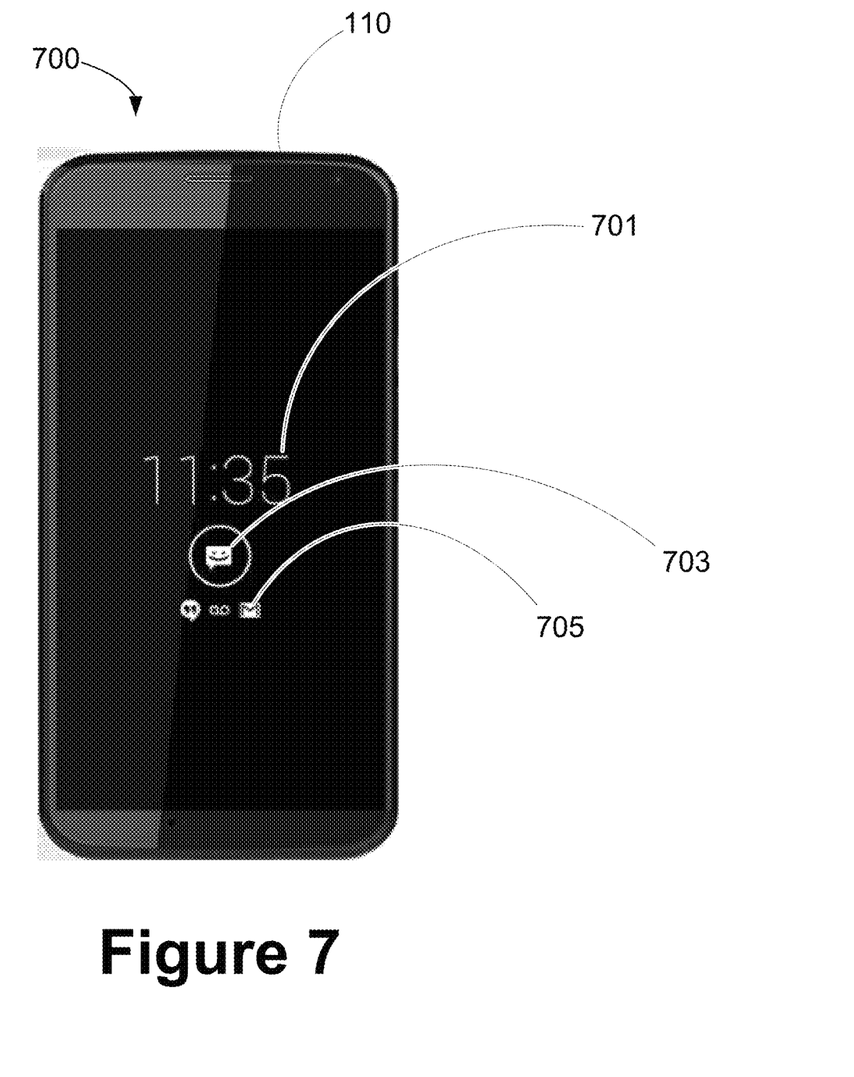
FIG. 7 is a simplified screen schematic showing screen displayed options for user selection in accordance with an embodiment of the described principles.

Another example use case is given in FIGS. 7 and 8, with respect to AOD (amount of detail) interactions, wherein the user can interact with all notifications, view a minimal notification set, view notification detail, or dismiss notification. When the user puts pressure on the device perimeter, the choices gravitate to the pressure point as shown in figure.

Referring more specifically to the device context 700 of FIG. 7, the display of the device 110 initially shows an awake but locked screen including the time of day 701, a notification icon 703, and options 705 for engagement. Moving to FIG. 8 and context 800, when the user presses their thumb 505 against the right side of the device perimeter, the available options 801, 803, 805 gravitate to the location on the screen nearest the thumb press location. In the illustrated example, one of the options pertaining to a received text 801 is shown largest and closest, whereas other options 803, 805 are shown in less detail and are further away from the press point.

In an embodiment, the user may rotate the positions of the options 801, 803, 805, e.g., by sliding their thumb 505 upward or downward, or may select any of the options 801, 803, 805 with their thumb. If the options 801, 803, 805 are rotated, then the current closest option 801, 803, 805 is shown with the greatest detail, in a further embodiment.

It will be appreciated that this system may further provide device power saving applications since it enables interactions on screen without standing by for touch events or even enabling touch sensing.

The system is implemented in the described examples via inductive sensors, and will be described in greater detail in that context. However, it will be appreciated that other sensor types may additionally or alternatively be used. Such other sensor types include without limitation thermal sensors, capacitive sensors and other touch, pressure or proximity sensors.

Figure 9:
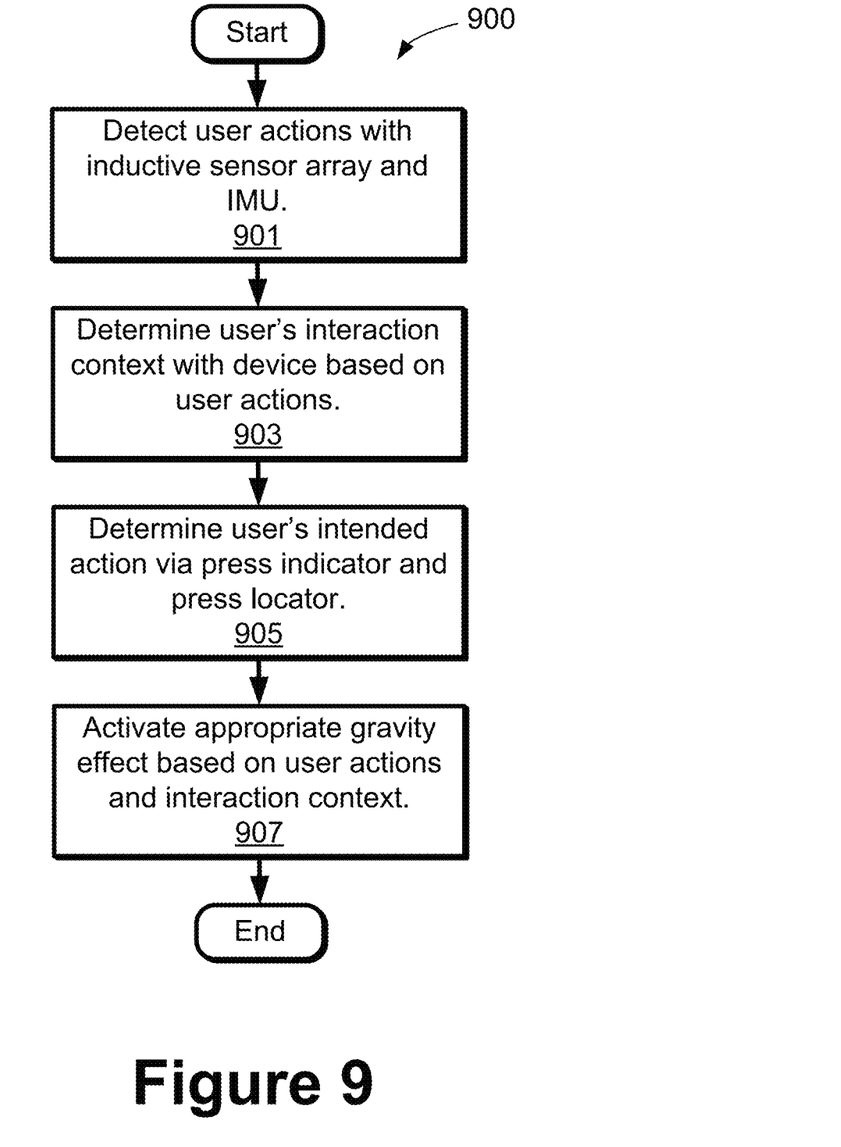
FIG. 9 is a flow chart showing a process for modification of selectable options in accordance with an embodiment of the described principles.

Turning to FIG. 9, an example system process flow is shown and will be discussed in conjunction with the example system architecture is shown in FIG. 3. The example architecture includes an action indicator 301, IMU 303, inductive sensor array 180, press indicator 305, press locator 307, and gravity link activator 309.

In operation, and referring now to stage 901 of the process 900, the device 110 first detects user actions with the inductive sensor array 180 and the sensors of the IMU 303. At stage 903, the device determines, based on the values sensed in stage 901, what the user's interaction context with the device is, e.g., whether the user is holding the device 110 in their hand and looking at the device screen. At this point, at stage 905, the device determines, via the press indicator 305 and press locator 307, what the user's intended action is, e.g., whether the user is pressing the side to gravitate selectable elements to a potential touch point or holding the device without a thumb press at all, indicating a potential screen selection via the user's thumb.

Finally, at stage 907, the device activates the appropriate gravity effect (via the gravity link activator 309). Thus, if the detected user actions and device context indicate an AOD interaction (e.g., lock screen is showing time and options and thumb location indicates AOD desired), the device redraws the screen with elements aggregated and expanded closer to the thumb press location, as shown in FIG. 7 for example. Alternatively, if the user's actions and device context indicate potential selection of remotely located selectable elements using the active digit (e.g., "yes" and "no" or "ok" and "cancel" are being displayed and the user hold indicates impending selection) for example, then the device redraws the display to array the selectable options within range of the active digit as shown by way of example in FIG. 5.

Figure 10:
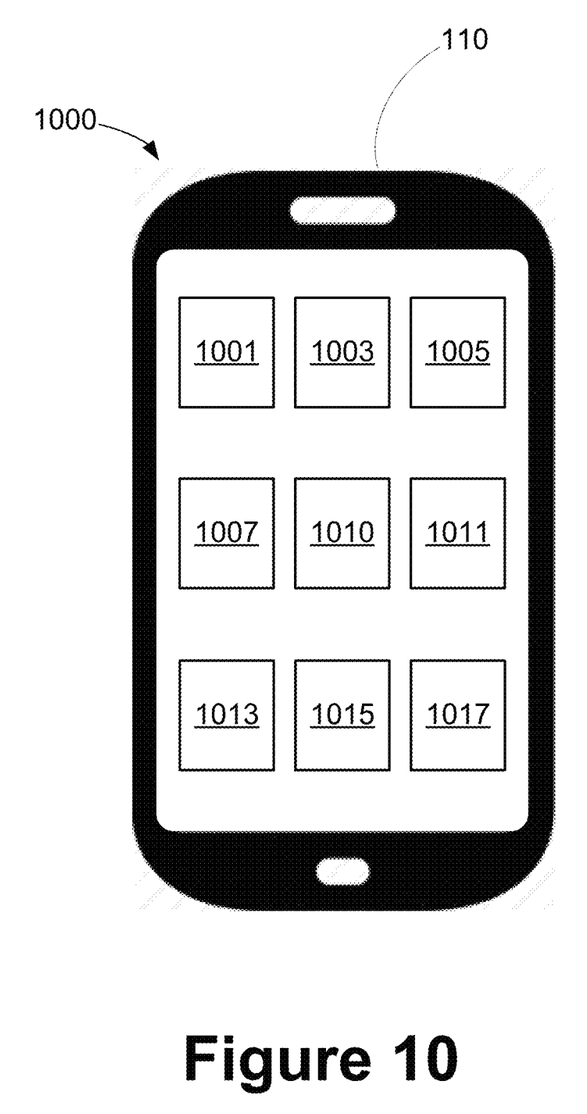
FIG. 10 is a simplified screen schematic showing screen displayed options for user selection in accordance with an embodiment of the described principles.

Although the examples shown and discussed herein relate to right-handed device usage, it will be appreciated that the same principles can be applied to left-handed use of a device. It will be further appreciated that other user action and device context combinations are possible, and that similar ease of use modifications may be made in such circumstances. For example, referring to FIG. 10, the device context 1000 is that the display of the device 100 shows a number of home screen icons 1001, 1003, 1005, 1007, 1009, 1011, 1013, 1015, 1017. This may occur, for example, upon unlocking of the device 110, prior to activation of any particular function or application on the device 110.

Figure 11:
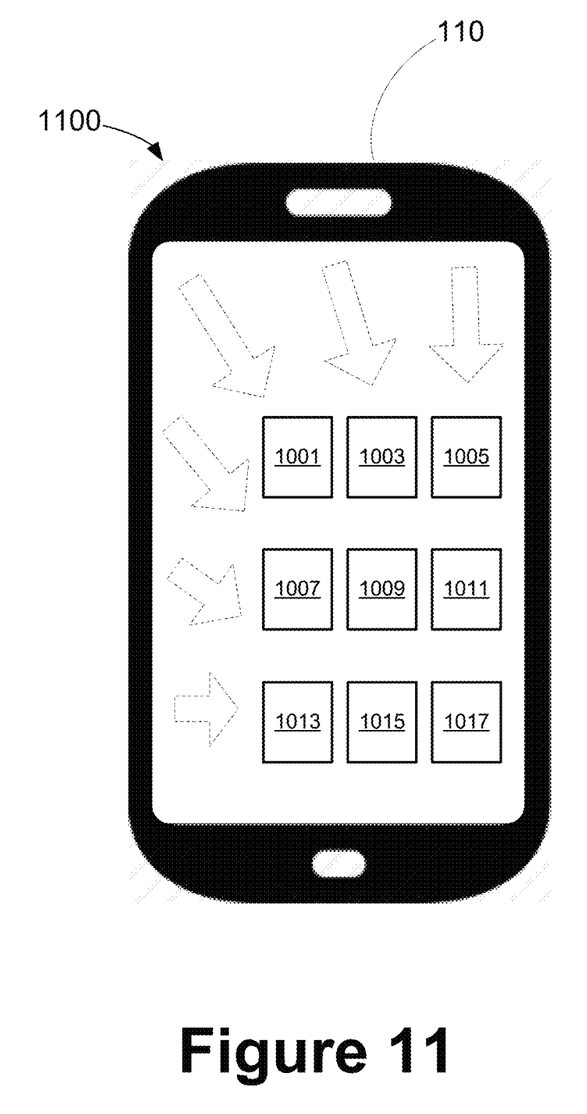
FIG. 11 is a simplified screen schematic showing migration of selectable options in accordance with an embodiment of the described principles.

If, as shown in the device context 1100 of FIG. 11, a user interaction (device hold angle, user hold position on device, etc.) is then detected indicating an impending selection by the user while employing the thumb as the active digit, the device may redraw the selection of icons 1001, 1003, 1005, 1007, 1009, 1011, 1013, 1015, 1017 such that they would all fall within easy range of the user thumb. In this way, the user can then more easily select any option without re-gripping the device, switching their active digit, or overextending the active digit.

Although the described principles involve the manipulation of a visual interface, it will be appreciated that the system provides an alternative means of input to the touch screen in the event the touch screen is turned off, e.g., due to power saving mode/state or touch screen failure. Such alternative means may include adjustment of device attitude, spoken commands, and so on.

It will be appreciated that various innovative systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device comprising:
   a housing having a perimeter and a back surface;
   a touch sensitive screen;
   a plurality of touch sensors disposed at the perimeter and at least one sensor disposed on the back surface, the touch sensors being adapted to detect an exerted pressure from a user digit or grasp; and a processor linked to the touch sensitive screen and the plurality of touch sensors, configured to determine a contact location of a user digit, to determine a contact pressure at the contact location and to modify an appearance of visual material displayed on the touch sensitive screen in response to the contact location and contact pressure;

wherein the visual material displayed on the touch sensitive screen comprises one or more user-selectable icons; and wherein modifying the appearance of the visual material displayed on the touch sensitive screen comprises modifying an amount of visual detail associated with at least one of the user-selectable icons selected from a minimal notification set, a view notification detail, or a dismiss notification.

2. The mobile electronic communications device in accordance with claim 1, further comprising an inertial measurement unit (IMU), and wherein the processor is further configured to determine a device attitude based on the IMU and wherein modifying the appearance of visual material displayed on the touch sensitive screen in response to the contact location and contact pressure further comprises modifying the appearance of visual material displayed on the touch sensitive screen in response to the device attitude.

3. The mobile electronic communications device in accordance with claim 1, wherein modifying the appearance of the visual material displayed on the touch sensitive screen comprises moving at least one of the user-selectable icons toward the contact location.

4. The mobile electronic communications device in accordance with claim 1, wherein modifying the appearance of the visual material displayed on the touch sensitive screen comprises shrinking at least one of the user-selectable icons.

5. The mobile electronic communications device in accordance with claim 1, wherein modifying an amount of visual detail associated with at least one of the user-selectable icons comprises modifying an amount of visual detail associated with multiple user-selectable icons, and wherein one of the multiple user-selectable icons is displayed with greater detail than others of the multiple user-selectable icons.

6. The mobile electronic communications device in accordance with claim 5, wherein the processor is further configured to select the one of the multiple user-selectable icons based on time of last activity.

7. The mobile electronic communications device in accordance with claim 5, wherein the processor is further configured to select the one of the multiple user-selectable icons based on urgency.

8. The mobile electronic communications device in accordance with claim 1, wherein modifying the appearance of the visual material displayed on the touch sensitive screen further comprises modifying the appearance of the visual material displayed on the touch sensitive screen at a speed determined by the contact pressure.

9. The mobile electronic communications device in accordance with claim 1, wherein the processor is further configured to modify the appearance of the visual material displayed on the touch sensitive screen in response to a change in the contact pressure.

10. The mobile electronic communications device in accordance with claim 9, wherein modifying the appearance of the visual material displayed on the touch sensitive screen in response to a change in the contact pressure comprises rotating selectable options based on a change in the contact location resulting from the contact location sliding along the perimeter of the housing while remaining in contact with the perimeter of the housing.

11. The mobile electronic communications device in accordance with claim 9, wherein modifying the appearance of the visual material displayed on the touch sensitive screen in response to a change in the contact pressure comprises selecting a selectable option based on a change in the contact pressure.

12. The mobile electronic communications device in accordance with claim 1, wherein the plurality of touch sensors comprises one or more inductive sensors.

13. A method of facilitating user interaction with a touch sensitive screen of a mobile electronic communication device, the mobile electronic communication device also having a housing surface comprising a device surface excluding the touch sensitive screen, the method comprising:

displaying visual matter comprising a plurality of icons on the touch sensitive screen;

detecting a touch on the housing surface, the touch having a touch location and touch pressure; and modifying an appearance of the visual matter on the touch sensitive screen based on the touch location and touch pressure by moving at least one icon of the plurality of icons toward the touch location and at least one other icon of the plurality of icons away from the touch location.

* * * * *